Feb. 20, 1951 A. L. CHANDLER 2,541,984
GRAIN UNLOADING ATTACHMENT FOR COMBINES
Filed May 4, 1948 2 Sheets-Sheet 2

INVENTOR.
Arthur L. Chandler
BY
W. A. McGrew
ATTORNEY

Patented Feb. 20, 1951

2,541,984

UNITED STATES PATENT OFFICE 2,541,984

GRAIN UNLOADING ATTACHMENT FOR COMBINES

Arthur L. Chandler, Yuma, Colo., assignor to Hi-Way Implement Company, Yuma, Colo., a firm composed of A. L. Chandler and A. G. Hisam Application May 4, 1948, Serial No. 24,996

10 Claims. (Cl. 214—83.32)

This invention relates to new and useful improvements in material handling apparatus, and more particularly to a quick detachable and attachable unloading attachment for grain combines which makes it possible to unload grain from the hopper thereof into wagons or trucks which have bodies or sides, frequently too high to be positioned in receiving position beneath the combine hopper. With this attachment, large capacity trucks can be conveniently driven along side of the combine and automatically loaded with grain from the hopper of the combine without manual handling and with great saving of time in getting the grain off of the field and safely on its way to storage.

Another object of the invention is to provide unloading apparatus which can be easily attached to the present combines and be driven by power derived therefrom.

A further object of the invention is to provide a strong and economical installation including a conveyer screw which is normally idle, but which can be operated at will from a power take-off by means of a simple belt tightener arrangement.

Other objects and advantages of the invention will become apparent during the course of the following description.

In the accompanying drawings showing the preferred embodiment of the invention and forming a part of the description thereof and wherein like numerals are employed to designate like parts throughout the several views, Fig. 1 is a side elevation of the invention showing it attached to a grain combine with a truck shown in dotted lines in position to receive grain from the combine hopper.

Figure 1:
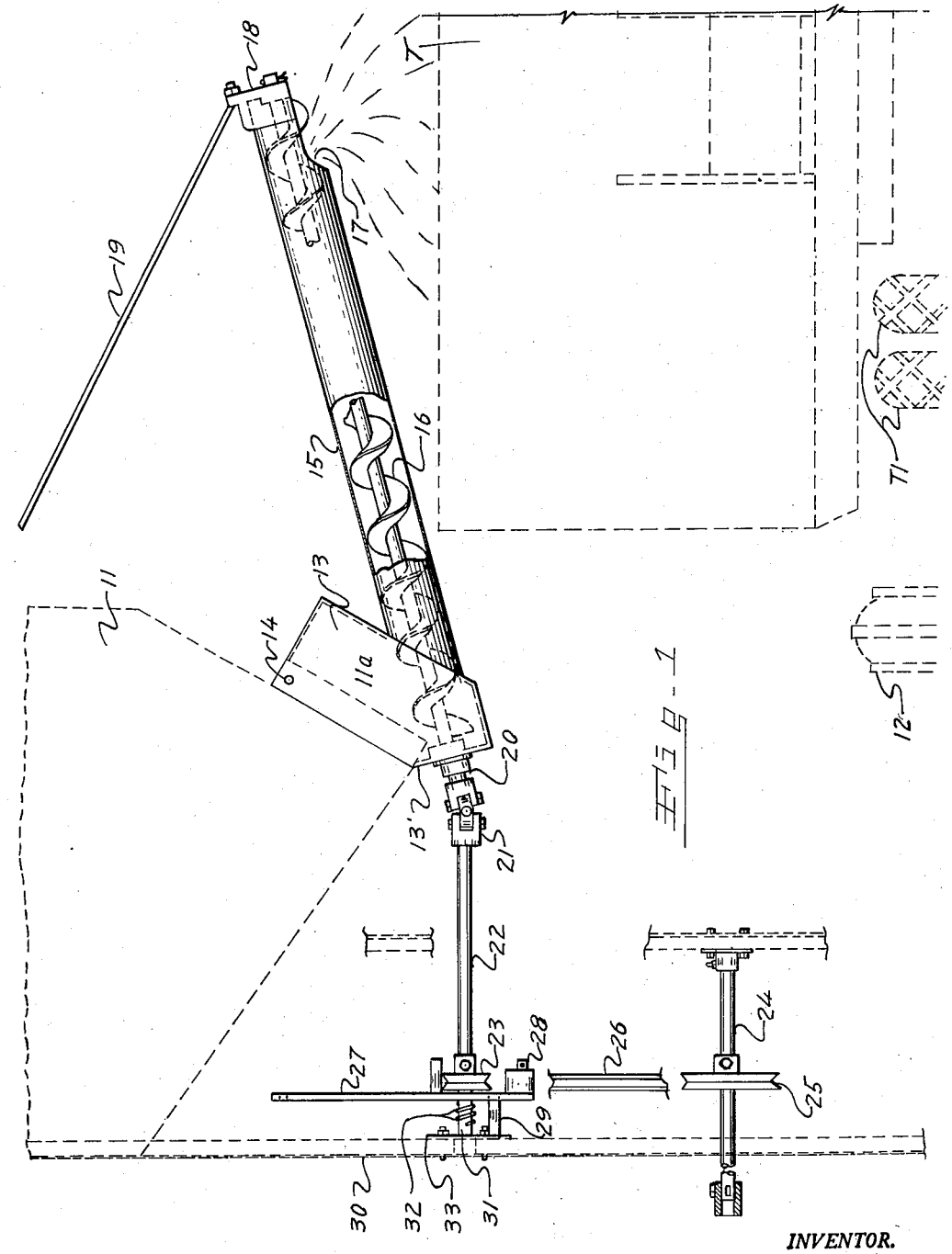
Figure 2:
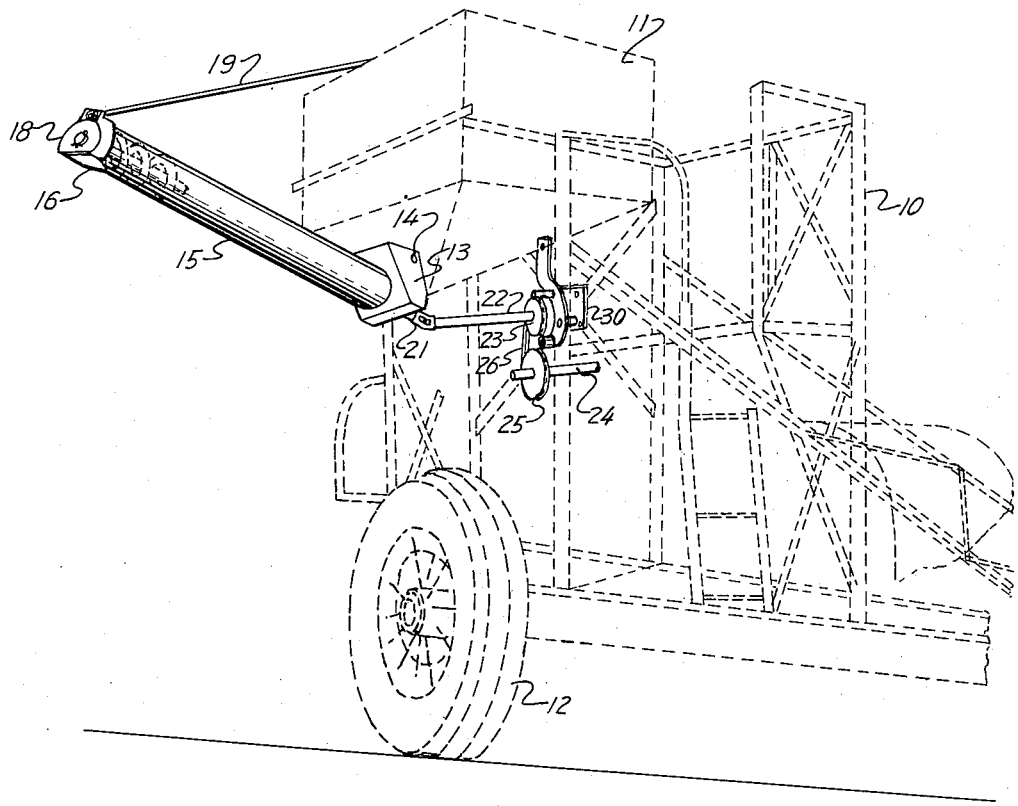
Fig. 2 is a perspective view of the hopper side of a "Baldwin Gleaner Combine" showing the invention attached in operative position thereon.

Referring now more particularly to the drawings for a specific description of the invention, the numeral 10 designates in dotted lines, the superstructure of a power driven "Baldwin Gleaner Combine" having the usual elevated grain hopper or bin 11 and bull wheel 12 well recognized in the art, so that further description thereof is unnecessary here for the purposes of the present invention, except to note from Fig. 1 that the outside of the inclined bottom of the hopper has a lateral discharge opening bordered with a pair of vertically inclined lateral flanges 11a, between which threshed grain in the hopper is passed by gravity to a wagon disposed therebeneath. However, it is often desirable to empty the grain from the hopper into a high walled large capacity truck or vehicle, which under ordinary circumstances cannot, because of its high side walls contacting with the hopper 11, be driven or disposed beneath the outlet of the hopper, and consequently the grain must be shoveled out or a special conveyer inserted into the hopper to discharge its contents. Such extra handling of the grain is an added expense, to say nothing of slowing down the harvest when every minute is important in getting the grain from the fields and under cover prior to rains or storms. Consequently, the main purpose of this invention is to provide a power driven unloader attachment which can be easily and quickly installed upon the usual hopper of a standard type of combine to automatically discharge the grain into a large capacity high walled truck T, approximately one-half of which is shown in dotted lines in Fig. 1 with only the rear wheels T' at one side of the back of the truck being illustrated. The attachment is also useful in discharging the grain directly from the combine into storage and other places into which the usual discharge arrangement on the combine could not accomplish.

This usual discharge arrangement of the combine is replaced with a generally rectangular compartment 13 which is pivotally supported at 14 by a removable pin or bolts at its upper corner upon the flange 11a and to one side of the center of gravity of the compartment, so that it hangs pendant from its pivot in communication with the hopper 11 and is easily attached and detached. An elongated tubular screw conveyer spout or housing 15 communicates with the lower outside wall of the compartment 13 and extends outwardly and upwardly at the inclination shown to clear a high walled truck. This conveyer spout 15 is secured to the compartment 13 in any suitable manner so that the latter may be considered an integral enlarged lower end of the spout. Thus, the spout 15 and compartment 13 become a cantilever arm, and being pivoted at 14 to the hopper 11, the weight of the arm causes the compartment to be urged tightly against the hopper for partial support of the spout and to prevent leakage of the grain through the joints between the compartment and hopper. A back wall 13' of the compartment is arranged beneath the hopper at a right angle to the axis of the spout and is provided with a bearing for the lower end of the shaft of a screw conveyer 16 extending axially and longitudinally through the spout and into the compartment 13 to move grain from the latter up through the inclined spout to be discharged through a discharge orifice 17 in the outer end of the spout formed by removing a segment of the underside of the spout adjacent its outer end. This outer end of the spout is closed by a removable cap 18 having a bearing for the support of the upper end of the shaft of the screw conveyer which projects through the cap and is cotter pinned to prevent accidental displacement of the cap. A rod 19 which may be adjustable in length, has one end connected with the top of the hopper 11 and its lower end connected with the cap 18 and it will be understood that it can be adjusted to sustain some portion of the weight of the spout as may be desired, the balance of the weight being supported by abutment of the compartment 13 with the hopper 11, or partially by a spring arrangement to be presently described.

Figures 3, 3A:
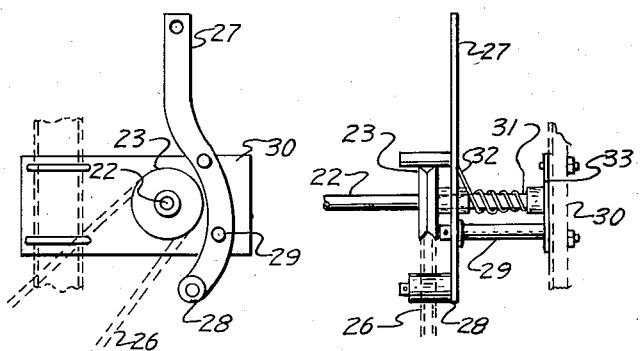
Fig. 3 is a front elevation of the power take-off and the means employed to control the operation of the screw elevator.
Fig. 3a is a side elevation of the same mechanism.

The lower end of the shaft of the screw 16 projects through and beyond the wall 13' to be disposed beneath the hopper 11 where it is equipped with one section 20 of a universal joint; the other half of this joint 21 being connected to a jack shaft 22 extending inwardly toward the side of the combine to be there provided with a pulley 23 having an axial socket to slip over the end of a stub shaft 31 extending outwardly from a plate 33 secured to the side of the combine structure, as best seen in Figs. 1 and 3a. Thus, with the jack shaft 22 connected to the screw conveyer shaft, its pulley 23 can be easily slipped on or off of the end of the stub-shaft 31 by simply moving the jack shaft axially outwardly to swing the compartment 13 on its pivot 14 sufficiently to permit engagement or disengagement of the pulley with the stub-shaft 31 when assembling or removing the attachment from the combine.

Also extending outwardly from the plate 33 is a pivot pin 29 for a belt tightener lever 27 having an idler roller 28 mounted on its lower end for selective engagement with a belt 26 trained over the pulley 23 and a pulley 25 on a power take-off shaft 24 connected with suitable mechanism of the combine which is not shown, but serves to provide power for driving the belt 26 and the screw conveyer 16 as desired. These pulleys, belt and tightener 27 provide a suitable power take-off from the combine. A tension coiled spring loaded or tensioned as desired, is positioned upon the shaft 31 with one end secured to the same and its other end engaging the belt tightener arm 27 to normally hold the latter in the position shown in Fig. 3 with the belt engaging roller 28 disengaged from the belt, so that the screw conveyer is driven only when the lever 27 is pulled with a cable from the unloading station. This coiled spring may also be utilized to resist the inward thrust of the jack shaft 22 caused by the weight of the unloading attachment to cushion the same and to regulate the amount of pressure of the compartment 13 against the hopper 11 caused by the cantilever action of the spout 15 and associated parts.

With the unloader attachment in place on a combine, and due to the upward inclination of the spout 15 and its adjustable clearance from the ground, it will be seen that high walled trucks can conveniently be driven alongside of the combine beneath the upper end of the spout to receive the grain from the combine hopper with dispatch. It will also be seen that this unloading attachment can be easily removed from the combine when its use is not required and the combine is to be transported, or readily installed when its use is again desired.

From the foregoing description, it will be understood that various changes in the size, shape and relation of parts may be resorted to without departing from the spirit of the invention.

Having thus described the invention, what is claimed is:

1. The combination with a power driven combine having an elevated bin or hopper and a power take-off shaft, of a conveyor spout operatively communicating with the lower end of said hopper, the conveyer spout being connected to the hopper, said connection providing for selective movement out of operative communication with the said lower end of the hopper, a conveyer screw in said spout having a shaft extending beneath and spaced from the bottom of said hopper, and drive means connecting said take-off and conveyer shafts.

2. The combination with a power driven combine having an elevated hopper and a power take-off shaft, of an upwardly inclined spout extending outwardly of said hopper and swingably attached to and communicating with the lower end of the said hopper, a conveyer screw in said spout having a shaft extended downwardly at an incline beneath and spaced from the bottom of said hopper and terminating in a universal joint, and drive means connecting said shafts.

3. The combination with a power driven combine having an elevated hopper and a power take-off shaft, said hopper having a lateral opening adjacent its lower end with a pair of flanges, a discharge compartment detachably and swingably secured to said flanges and extending below said hopper, of a conveyer spout communicating with said compartment, a conveyer screw in said spout having a shaft extending through said compartment and terminating in a universal joint beneath and spaced from the bottom of said hopper, and drive means connecting said shafts.

4. The combination with a power driven combine having an elevated hopper and a power take-off shaft, said hopper having a lateral opening adjacent its lower end with a pair of lateral flanges; of an upwardly inclined spout having an enlarged end overlapping said flanges and detachably secured thereto to support the lower end of said spout, a rod connecting the outer end of said spout to the upper end of said hopper for supporting said outer end said spout and detachable means forming the sole support of said spout, a conveyer screw in said spout having a shaft extending beneath said hopper, and drive means connecting said shafts.

5. The combination with a power driven combine having an elevated hopper and a power take-off shaft, said hopper having a lateral discharge opening adjacent its lower end with a pair of lateral flanges; of an upwardly inclined tubular spout having an enlarged lower end overlapping said flanges to assist in supporting said enlarged end, the outer end of said tubular spout having a segment of its underside removed to form a discharge opening, a cap for said outer end having a bearing and an attaching ear, a rod having one end connected to said ear and its other end connected to said hopper for supporting the outer end of said spout, a conveyer screw shaft extending axially through said tubular spout and having its outer end journaled in said bearing of said cap and its inner lower end journaled in said cap and its inner lower end journaled in said compartment directly beneath said hopper discharge opening and extending beneath said hopper, and drive means connecting said shafts.

6. The combination with a power driven combine having an elevated hopper and a power take-off, said hopper having a discharge opening at its lower end; of a substantially rectangular compartment pivoted to said hopper above said discharge opening, a discharge spout extending as a cantilever from said compartment to cause the latter to pivot and bear tightly against said hopper, a conveyer screw mounted in said spout and extending into said compartment to remove grain therefrom, and drive means connecting said power take-off and said conveyer screw.

7. An unloader attachment for combines having an unloading hopper with a discharge opening at its lower end, comprising an unloading spout having an enlarged compartment-like end portion adapted to be pivoted to said hopper as a cantilever whereby the weight of said spout forces its enlarged end snugly against said discharge opening, and a screw conveyer mounted axially in said spout.

8. The combination with a power driven combine having an elevated hopper and a power driven take-off pulley below the same, a driven pulley shaft with a pulley above said power take-off belted to said take-off pulley, a belt tightener associated with said belt to cause operation of said pulley shaft at will, of a conveyer spout communicating with the lower end of said hopper, a conveyer screw mounted in said spout and having a shaft extending beneath said hopper, and a universal joint connecting said last-named shaft with said driven pulley shaft.

9. In combination with a power driven combine having an elevated hopper and a power driven take-off pulley, a stub shaft having a tension spring coiled thereon, a jack shaft having a pulley fixed thereon to slip over said stub shaft against said coiled spring, a belt idly trained over said pulleys, a belt tightener lever pivotally mounted with an idler roller at one end adapted to engage said belt and its other end engaged with said spring which normally holds such lever and idler pulley disengaged from said belt, a conveyer spout communicating with the lower end of said hopper, a crew conveyer in said spout having a shaft projecting beneath the same, and a universal joint connecting said conveyer shaft with said jack shaft.

10. In combination with a power driven combine having an elevated hopper having a discharge opening adjacent its bottom and a power take-off including a stub shaft with a tension spring coiled thereon, a cantilever conveyer spout having an enlarged end pivoted to said hopper and forced in the direction thereof by the cantilever action of said spout, a screw conveyer mounted in said spout and extending through said enlarged end, and shaft means from said conveyer shaft having a pulley slidable upon said stub shaft against said coiled spring to cushion vibration of the device.

ARTHUR L. CHANDLER.

REFERENCES CITED

The following references are of record in the file of this patent:

UNITED STATES PATENTS

| Number | Name | Date |
|---|---|---|
| 1,615,334 | MacGregor | Jan. 25, 1927 |
| 1,751,601 | Raney et al. | Mar. 25, 1930 |
| 1,869,581 | Paradise et al. | Aug. 2, 1932 |
| 2,022,166 | Welty | Nov. 26, 1935 |
| 2,296,014 | Benzel, Sr., et al. | Sept. 15, 1942 |
| 2,408,952 | Raney | Oct. 8, 1946 |
| 2,438,301 | Schulte | Mar. 23, 1948 |